(12) United States Patent
Prebble et al.

(10) Patent No.: US 8,767,008 B2
(45) Date of Patent: Jul. 1, 2014

(54) SYSTEM AND METHOD FOR PRODUCING OUTER SHADOWS AND REFLECTIONS

(75) Inventors: Tim Prebble, Longmont, CO (US); Darrell Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 565 days.

(21) Appl. No.: 13/174,503

(22) Filed: Jun. 30, 2011

(65) Prior Publication Data

US 2013/0007582 A1 Jan. 3, 2013

(51) Int. Cl.
 *G06G 5/00* (2006.01)
(52) U.S. Cl.
 USPC .......................................................... 345/619
(58) Field of Classification Search
 None
 See application file for complete search history.

(56) References Cited

U.S. PATENT DOCUMENTS

| | | | | |
|---|---|---|---|---|
| 2008/0192062 | A1* | 8/2008 | Guinan et al. | 345/581 |
| 2008/0292215 | A1* | 11/2008 | Gaucas et al. | 382/298 |

* cited by examiner

*Primary Examiner* — Xiao M. Wu
*Assistant Examiner* — Yingchun Le
(74) *Attorney, Agent, or Firm* — Osha Liang LLP (57) ABSTRACT

A method for rendering a page, including: obtaining an electronic document (ED) identifying a main object and multiple shadow parameters; determining a main bounding box surrounding the main object on the page; creating a main brush including the main object; calculating a shadow bounding box based on the main bounding box and at least one of the multiple shadow parameters; creating a shadow brush by applying a shadow transformation matrix to the main brush, where the shadow transformation matrix maps the main object to a shadow defined by the multiple shadow parameters; inserting, into a main display list for the page, a set of instructions to: paint the shadow bounding box with the shadow brush; and paint the main bounding box with the main brush.

21 Claims, 8 Drawing Sheets

SYSTEM AND METHOD FOR PRODUCING OUTER SHADOWS AND REFLECTIONS

BACKGROUND

An electronic document (ED) may identify a main object (e.g., text, images, and/or graphics) and define a variety of effects (e.g., outer shadows, reflections, etc.) to be applied to the main object. It is the responsibility of a Page Rendering Device (PRD) or user machine to place the main objects and their effects on a page as specified by the ED.

Even though an ED may specify a main object and the parameters associated with the one or more effects to be applied to the main object, the bounding box surrounding the main object might not be reliably specified by the document markup language (e.g., OOXML) of the ED. However, the rasterized object and its bounding box are needed to create the specified effects. For example, it is the main object, as outputted (i.e., rasterized), that is reflected and/or shadowed, not the main object in a pre-rasterized state. Regardless, users still like specifying effects to be applied to main objects in an ED written in a document markup language.

SUMMARY OF INVENTION

In general, in one aspect, the invention relates to a method for rendering a page. The method comprises: obtaining an electronic document (ED) identifying a main object and a plurality of shadow parameters; determining a main bounding box surrounding the main object on the page; creating a main brush comprising the main object; calculating a shadow bounding box based on the main bounding box and at least one of the plurality of shadow parameters; creating a shadow brush by applying a shadow transformation matrix to the main brush, wherein the shadow transformation matrix maps the main object to a shadow defined by the plurality of shadow parameters; inserting, into a main display list for the page, a first plurality of instructions to: paint the shadow bounding box with the shadow brush; and paint the main bounding box with the main brush; and rendering the page according to the main display list.

In general, in one aspect, the invention relates to a method for rendering a page. The method comprises: obtaining an electronic document (ED) identifying a main object and a plurality of reflection parameters; determining a main bounding box surrounding the main object on the page; creating a main brush comprising the main object; calculating a reflection bounding box based on the main bounding box and the plurality of reflection parameters; calculating a reflection transformation matrix mapping the main object to a reflection defined by the plurality of reflection parameters; and inserting, into a main display list for the page, a plurality of instructions to: paint the reflection bounding box with the main brush after applying the reflection transformation matrix to the main brush; and paint the main bounding box with the main brush; and rendering the page according to the main display list.

In general, in one aspect, the invention relates to a non-transitory computer readable storage medium storing instructions for rendering a page. The instructions comprise functionality to: obtain an electronic document (ED) identifying a main object and a plurality of shadow parameters; determine a main bounding box surrounding the main object on the page; create a main brush comprising the main object; calculate a shadow bounding box based on the main bounding box and at least one of the plurality of shadow parameters; create a shadow brush by applying a shadow transformation matrix to the main brush, wherein the shadow transformation matrix maps the main object to a shadow defined by the plurality of shadow parameters; and insert, into a main display list for the page, a first plurality of rasterizer instructions to: paint the shadow bounding box with the shadow brush; and paint the main bounding box with the main brush.

In general, in one aspect, the invention relates to a system for rendering a page of an electronic document (ED) identifying a main object and a plurality of shadow parameters. The system comprises: a hardware processor; a bounding box calculator executing on the hardware processor and configured to calculate a shadow bounding box based on a main bounding box surrounding the main object on the page and at least one of the plurality of shadow parameters; a transformation matrix generator executing on the hardware processor and configured to calculate a shadow transformation matrix mapping the main object to a shadow defined by the plurality of shadow parameters; a brush generator executing on the hardware processor and configured to: create a main brush based on the main object; and create a shadow brush by applying the shadow transformation matrix to the main brush; and a rasterizing engine executing on the hardware processor and configured to: paint the shadow bounding box with the shadow brush; and paint the main bounding box with the main brush.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for rendering a page of an ED identifying a main object, a shadow of the main object, and/or a reflection of the main object and/or shadow. Specifically, bounding boxes for the main object, the shadow, and one or more reflections on a page are calculated. A main brush having the main object and a shadow brush corresponding to the main brush following a transformation are created. Instructions to paint the bounding box of the main object and the bounding box of the shadow with the main brush and the shadow brush, respectively, are added to a main display list for the page. Further, instructions to paint the bounding boxes of the reflections using transformed versions of the main brush and/or shadow brush are added to the main display list for the page. Further still, instructions to paint a composite of all the reflection bounding boxes with a linear gradient opacity brush are added to the main display list. The page is then rendered according to the main display list.

Figure 1:
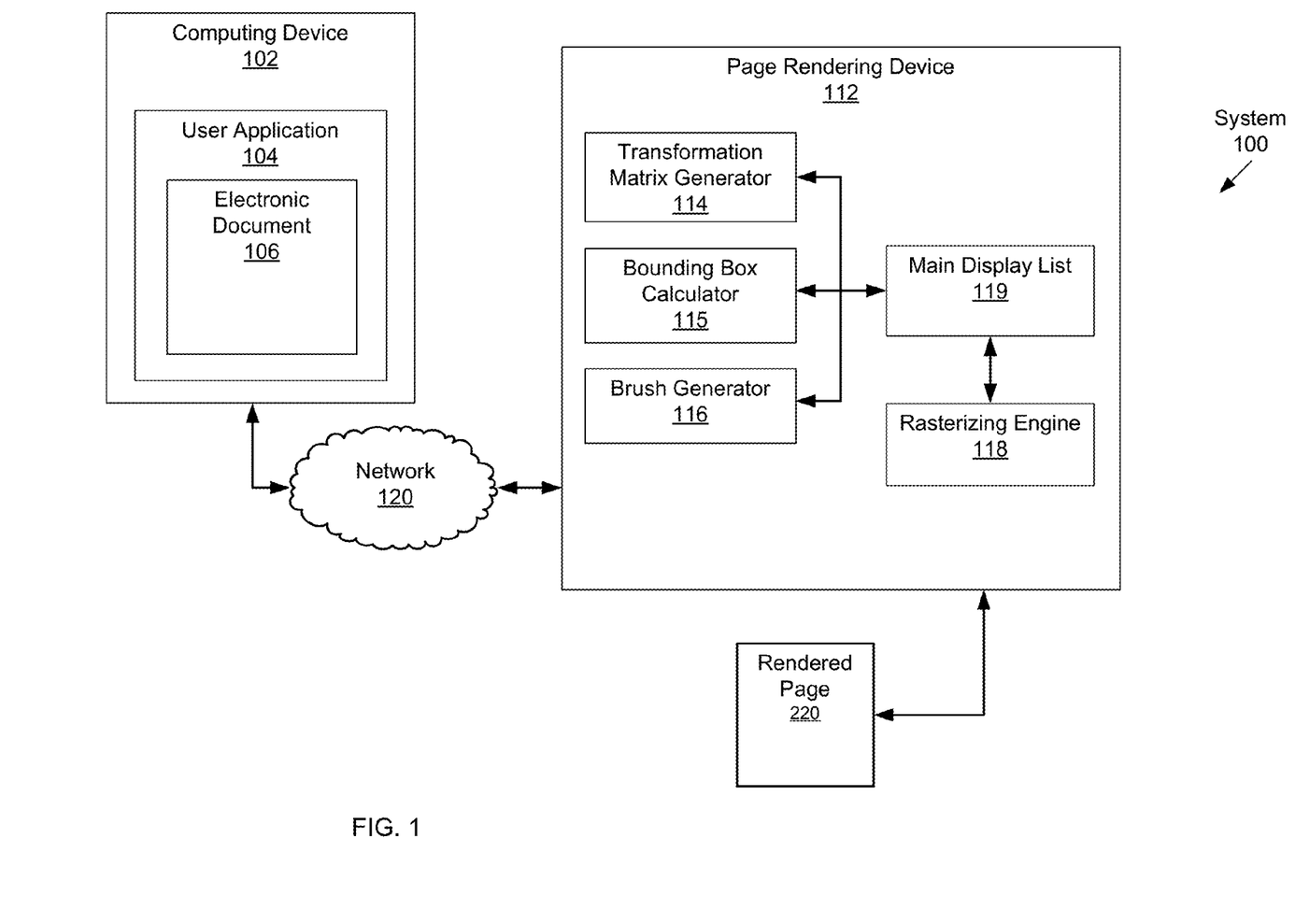
FIG. 1 shows a block diagram depicting a system in accordance with one or more embodiments of the invention.

FIG. 1 shows a system (100) in accordance with one or more embodiments of the invention. As shown in FIG. 1, the system (100) has multiple components including a page rendering device (PRD) (112) and a computing device (102). The PRD (112) may be a printer, an electronic reader, etc. The computing device (102) may be a personal computer (PC), a desktop computer, a mainframe, a server, a telephone, a kiosk, a cable box, a personal digital assistant (PDA), an electronic reader, a mobile phone, a smart phone, etc. There may be a direct connection (e.g., universal serial bus (USB) connection) between the computing device (102) and the PRD (112). Alternatively, the computing device (102) and the PRD (112) may be connected using a network (120) having wired and/or wireless segments.

In one or more embodiments of the invention, the PRD (112) is located on the computing device (102). In such embodiments, the PRD (112) may correspond to any combination of hardware and software on the computing device (102) for rendering an ED.

In one or more embodiments of the invention, the computing device (102) executes the user application (104). The user application (104) is a software application operated by a user and configured to obtain, input, generate, display, and/or print an ED (e.g., Electronic Document (106)) having any number of pages. Accordingly, the user application (104) may be a word-processing application, a spreadsheet application, a desktop publishing application, a graphics application, a photograph printing application, an Internet browser, etc. The user application (104) may generate new EDs and/or obtain previously saved EDs.

In one or more embodiments of the invention, the ED (106) includes a main object. The main object may correspond to any combination of text, images, and graphics to be displayed or printed on a page. Further, the ED (106) may specify one or more main object transformation parameters (i.e., rotation, scaling, skewing, translation, etc.) to be applied to the main object. Further still, the ED (106) may also specify one or more effects (e.g., outer shadow, reflections, etc.) to be applied to the main object.

In one or more embodiments of the invention, each effect is defined by one or more parameters. For example, the shadow effect is defined by multiple shadow parameters (e.g., color, transparency, blurring, skewing, scaling, shadow alignment, shadow direction, shadow offset distance, rotation, etc.). Similarly, the reflection(s) are defined by multiple reflection parameters (e.g., reflection offset distance, blurring, skewing, scaling, rotation, starting and ending alpha values for alpha gradient ramps, etc.).

In one or more embodiments of the invention, the ED (106) is represented/defined using a document markup language (e.g., ODF, OOXML, etc.). Accordingly, the main object, the main object transformation(s), and the parameters for the effects may be recorded as attributes within the tags of the document markup language. Moreover, these parameters are needed to correctly render the ED (106) for display or printing.

In one or more embodiments of the invention, the PRD (112) includes a brush generator (116). A brush is a collection of objects that, once rasterized, can be used to paint geometry. Accordingly, a brush may be considered a stamp that may be transformed (e.g., scaled, skewed, rotated, etc.) before it is applied to a page (e.g., Rendered Page (220)). Moreover, a brush can include other brushes.

In one or more embodiments of the invention, the brush generator (116) is configured to create a main brush including the main object following any transformations (e.g., rotation, skewing, scaling, etc.), as defined by the main object transformation parameters. Further, the brush generator (116) is also configured to create a shadow brush. The shadow brush corresponds to the main brush after applying a transformation relating the main object to the shadow defined by the shadow parameters. The shadow brush also includes the color and transparency features defined by the shadow parameters. Further still, the brush generator (116) is also configured to create a linear gradient opacity brush based on the reflection parameters (i.e., starting and ending alpha values for alpha gradient ramps, etc.).

In one or more embodiments of the invention, the PRD (112) includes a bounding box calculator (115). A bounding box may correspond to the rectangular footprint of an object on a page (e.g., Rendered Page (220)). Accordingly, a main object bounding box is a rectangular footprint of the main object on the page, a shadow bounding box is a rectangular footprint of the shadow on the page, a reflection bounding box is a rectangular footprint of the main object's reflection, and the reflected shadow bounding box is a rectangular footprint of the shadow's reflection on the page.

In one or more embodiments of the invention, the bounding box calculator (115) is configured to calculate the shadow bounding box, the reflection bounding box, and the reflected shadow bounding box from the main bounding box, transformation data for the main object, and the shadow parameters and/or reflection parameters. In general, bounding boxes are not visible on the rendered page (220).

In one or more embodiments of the invention, the PRD (112) includes a transformation matrix generator (114). The transformation matrix generator (114) is configured to calculate the mappings (i.e., transformation matrices) between the main object and its shadow, the main object and its reflection, and the shadow and its reflection. These transformation matrices may correspond to user-to-device matrices (i.e., converting from the user space of the ED (106) to the specific space used by the PRD (112)), user-to-brush matrices (i.e., converting from the user space of the ED (106) to a space used to define the brush), brush-to-brush matrices (i.e., converting from one brush space to another brush space), and brush-to-device matrices (i.e., converting from brush space to the specific space used by the PRD (112)). Further, these matrices are based on the shadow parameters and/or reflection parameters specified in the ED (106).

In one or more embodiments of the invention, the PRD (112) includes a rasterizing engine (118). The rasterizing engine (118) is configured to paint the main bounding box on the rendered page (220) with the main brush, paint the shadow bounding box on the rendered page (220) with the shadow brush, paint the reflection bounding box on the rendered page (220) with a transformed version of the main brush, and paint the reflected shadow bounding box on the page (220) with a transformed version of the shadow brush. Further still, the rasterizing engine (118) is also configured to paint a composite bounding box including the reflection bounding box and the reflected shadow box with a linear gradient opacity brush.

In one or more embodiments of the invention, the PRD (112) includes a main display list (119). The main display list corresponds to a series of instructions to be processed (i.e., executed, interpreted) by the rasterizing engine (118) in order to generate the rendered page (220). Accordingly, the main display list includes instructions (i.e., rasterizer instructions)

to paint geometry corresponding to bounding boxes with specific brushes following specific transformations (discussed above).

Figure 2:
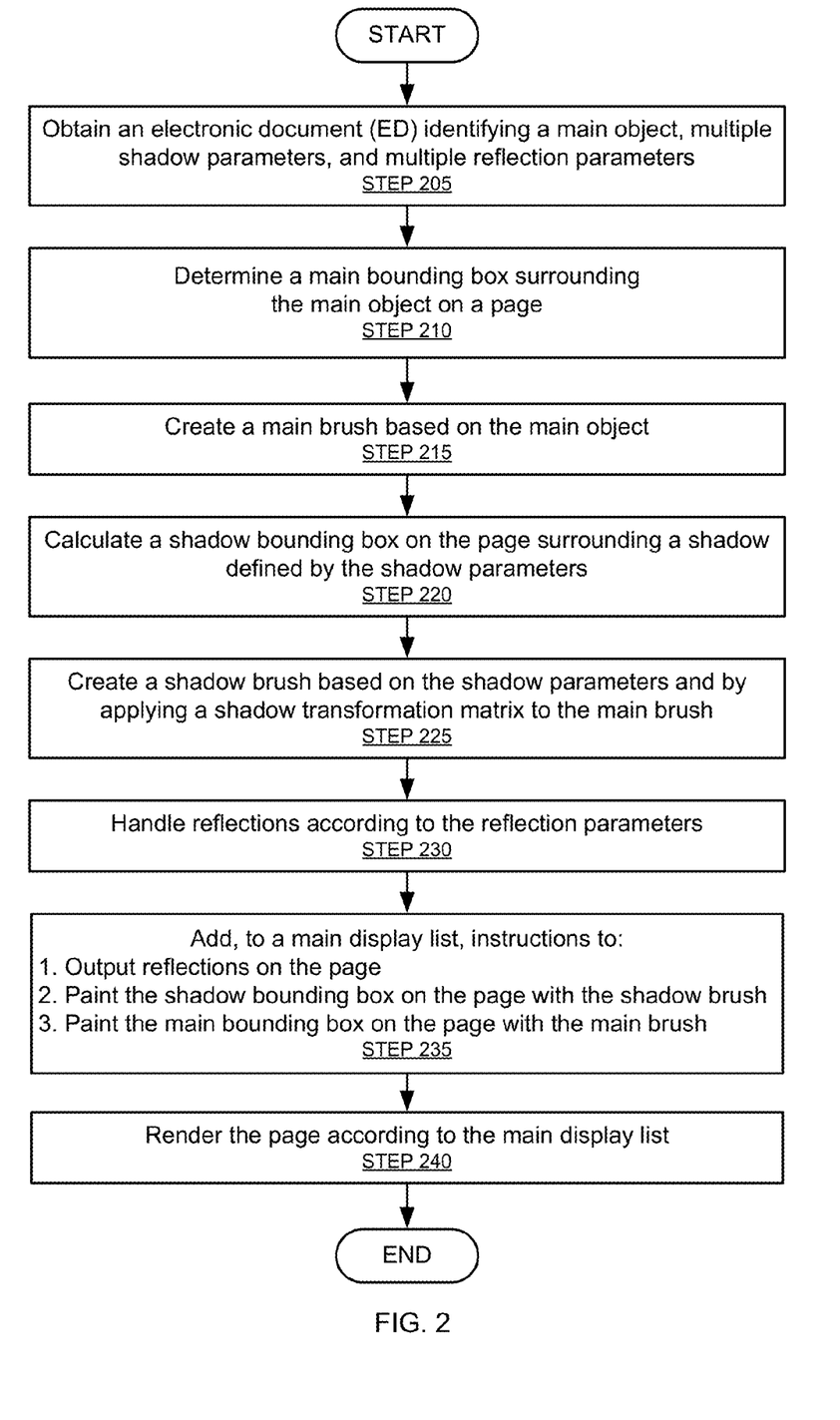
FIG. 2 shows a flowchart in accordance with one or more embodiments of the invention.

FIG. 2 shows a flowchart in accordance with one or more embodiments of the invention. The process described in FIG. 2 may be executed using one or more of the components of the system (100), discussed above in reference to FIG. 1. Moreover, the one or more steps in FIG. 2 may be repeated, omitted, and/or performed in parallel.

Initially, an ED identifying a main object is received (STEP 205). In one or more embodiments of the invention, the ED identifies multiple shadow parameters (e.g., color, transparency, blurring, skewing, scaling, shadow alignment, shadow direction, shadow offset distance, rotation, etc.) defining a shadow of the main object and/or the ED identifies multiple reflection parameters (e.g., reflection offset distance, blurring, skewing, scaling, rotation, starting and ending alpha values for alpha gradient ramps, etc.) defining a reflection of the main object and/or a reflection of the shadow. The ED may also identify transformation parameters (e.g., rotation, scaling, skewing, translation, etc.) for the main object. As discussed above, the ED is represented/defined using a document markup language (e.g., ODF, OOXML, etc.). Accordingly, the shadow parameters, the reflection parameters, and/or the main object transformation parameters in the ED may be recorded as attributes within the tags of the document markup language. The ED may be obtained by a page rendering device along with a request to render the ED.

In STEP 210, a main bounding box surrounding the main object on the page is determined. As the main bounding box is not reliably specified by the ED, the main bounding box may be determined by creating an auxiliary brush (i.e., a sizing brush group) for the main object, and then obtaining the bounding box from the auxiliary brush (i.e., the bounding box is a property of the auxiliary brush that can be accessed). In one or more embodiments of the invention, determining the main bounding box includes: (i) calculating a viewbox (i.e., a rectangular geometric area which is used to define the initial area of the brush; a window which identifies the contents of the brush) sufficiently large to encompass the largest allowable main object; (ii) creating the auxiliary brush using the viewbox and by specifying that the bounding box of the auxiliary brush should be derived from the contents of the auxiliary brush; and (iii) converting the bounding box of the auxiliary brush from brush space to user space. This bounding box is the main bounding box prior (i.e., main_bbox_prior) to applying user-space transformations derived from the main object's transformations identified in the ED. The main bounding box after (i.e., main_bbox_after) applying user-space transformations derived from the main object's transformations, if any, is also calculated.

In one or more embodiments of the invention, creating the auxiliary brush (i.e., item (ii)) includes: (a) allocating a new brush object (i.e., the auxiliary brush) that does not require rasterization; (b) creating a user-to-device transformation matrix for the main object in view of the main object's transformation parameters, if any, identified within the ED; (c) splitting the user-to-device transformation matrix into a user-to-brush transformation matrix and a brush-to-device transformation matrix, taking into account the calculated viewbox of item (i); (d) initializing the auxiliary brush's bounding box to be calculated based on its contents; and (e) adding the graphical data of the main object to the auxiliary brush by outputting the graphical data of the main object in view of the user-to-brush matrix of item (c). Item (e) causes the bounding box of the brush to be computed based upon the graphical data of the main object (i.e., the brush's contents). Item (e) does not result in a new display list being constructed.

Still referring to FIG. 2, in STEP 215, a main brush (i.e., a non-sizing brush) for the main object is created. Specifically, the main brush is created using a viewbox corresponding to the determined main bounding box (i.e., main_bbox_prior) (i.e., STEP 210), but slightly larger to compensate for minor rounding errors. In one or more embodiments of the invention, creating the main brush includes: (a) allocating a new brush (i.e., main brush) that requires rasterization; (b) creating a user-to-device transformation matrix for the main object in view of the transformation parameters, if any, identified within the ED; (c) splitting the user-to-device transformation matrix into a user-to-brush transformation matrix and a brush-to-device transformation matrix, taking into account the calculated viewbox; and (d) adding the display list objects (i.e., graphical primitives describing the main object) to the main brush. Item (d) includes initializing the main brush's bounding box to be calculated based on the viewbox; and outputting the graphical data of the main object in view of the user-to-brush matrix of item (c).

In STEP 220, the shadow bounding box surrounding the shadow defined by shadow parameters is calculated. Specifically, the shadow bounding box is calculated using the main bounding box (i.e., main_bbox_after), the main object transformations identified in the ED (if any), and the shadow parameters identified in the ED. As discussed above, examples of shadow parameters include color, transparency, blurring, skewing, scaling, shadow alignment, shadow direction, shadow offset distance, rotation, etc. A viewbox is subsequently calculated for the shadow based on the shadow bounding box.

In STEP 225, a shadow brush is created. In one or more embodiments of the invention, creating the shadow brush includes: (a) allocating a new brush (i.e., shadow brush) that requires rasterization; (b) designating the allocated brush as an outer shadow and setting its color and transparency according to the shadow properties; (c) calculating a user-to-device transformation matrix for the shadow based on the shadow bounding box (STEP 220); (d) splitting the user-to-device transformation matrix into a user-to-brush transformation matrix and a brush-to-device transformation matrix, taking into account the calculated viewbox; (e) creating a shadow transformation matrix by modifying the main brush's brush-to-device transformation matrix such that the rendered version of the main object will be transformed to produce the shadow (i.e., the shadow transformation matrix will translate, scale, and skew, etc., as defined by the shadow parameter(s), the rendered version of the main object); and (f) adding the display list objects to the shadow brush. Item (f) includes setting, as the current fill attribute, the main brush; and filling the area containing the outer shadow. The current fill attribute defines how subsequent geometry should be filled. For example, geometry can be filled with a brush, a solid color, a gradient, or an image.

In STEP 230, the reflections are processed according to the reflection parameters (discussed below in reference to FIG. 3). In STEP 235, instructions are added to the main display list to: (i) output reflections onto the page; (ii) paint the shadow bounding box on the page with the shadow brush (i.e., set, as the current fill attribute, the shadow brush and fill the area enclosed by the shadow bounding box); and (iii) paint the main bounding box (i.e., main_bbox_after) on the page with the main brush (i.e., set, as the current fill attribute, the main brush and fill the area enclosed by the main bounding box (i.e., main_bbox_after)).

In STEP 240, the page is rendered. Specifically, the main brush is rendered into an intermediary frame buffer followed by the shadow brush (i.e., two intermediary frame buffers will exist). The first intermediary frame buffer will be a visual representation of the main object; and the second intermediary frame buffer will be a transformed copy of the first but with the color values changed according to the shadow parameters. The contents of the first and second intermediary frame buffers are then used as indicated in the commands in the main display list to render onto the page the main object with its shadow and reflections.

Figure 3:
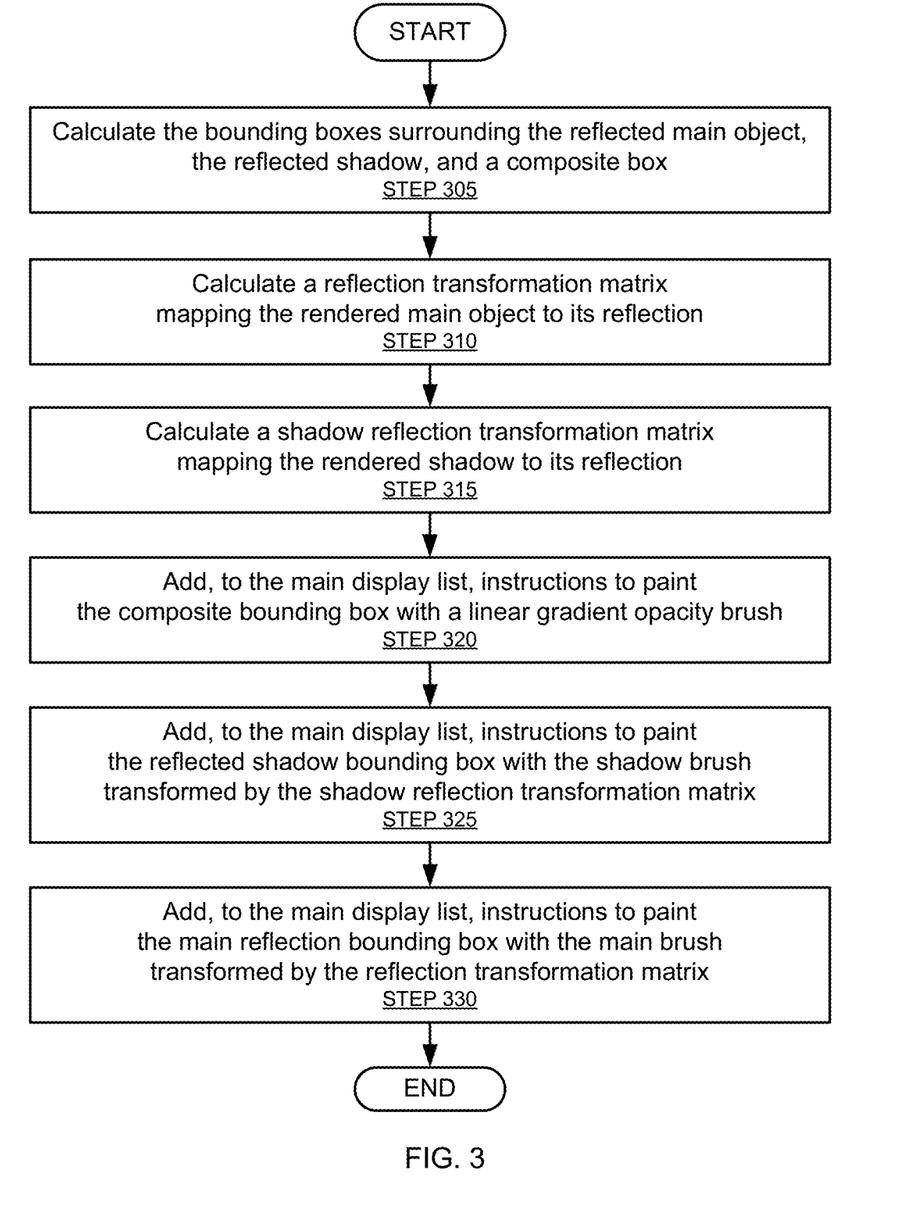
FIG. 3 shows a flowchart in accordance with one or more embodiments of the invention.

FIG. 3 shows a flowchart in accordance with one or more embodiments of the invention. The process described in FIG. 3 may be executed using one or more of the components of the system (100), discussed above in reference to FIG. 1. Further, the process described in FIG. 3 may be considered an expansion of STEP 230 and/or STEP 235, discussed above in reference to FIG. 2. Moreover, the one or more steps in FIG. 3 may be repeated, omitted, and/or performed in parallel.

Initially, the bounding boxes surrounding the reflected main object (i.e., reflection bounding box) and the reflected shadow (i.e. reflected shadow bounding box) are calculated (STEP 305). Specifically, the reflection bounding box is calculated based on the main bounding box (i.e., main_bbox_after) and the reflection parameters identified in the ED. Similarly, the reflected shadow bounding box is calculated based on the shadow bounding box, the main bounding box, and the reflection parameters identified in the ED. In addition, a composite box corresponding to the union of the reflection bounding box and the reflected shadow bounding box is calculated.

In STEP 310, a reflection transformation matrix mapping the main object to its reflection is calculated. The reflection transformation matrix must appropriately transform (i.e., translate, scale, flip, skew, rotate, etc.) the main brush to produce the reflection defined by the reflection parameters in the ED.

In STEP 315, a shadow reflection transformation matrix mapping the shadow to its reflection is calculated. The shadow reflection transformation matrix must appropriately transform (i.e., translate, scale, flip, skew, rotate, etc.) the shadow brush to produce the shadow reflection defined by the reflection parameters in the ED.

In STEP 320, instructions to paint the composite bounding box (i.e., the aggregate of the reflection bounding box and the reflected shadow bounding box) with a linear gradient opacity (LGO) brush are added to the main display list. The LGO brush adds a transparency gradient effect to the reflections. By applying the LGO brush over the composite bounding box, the reflection of the main object and the reflected shadow are effectively treated as a single object, and the transparency will vary smoothly over both the reflection and the shadow reflection.

In STEP 325, instructions to paint the reflected shadow bounding box with the shadow brush transformed by the shadow reflection transformation matrix are added to the main display list. In other words, the instructions are to fill the reflected shadow bounding box with the shadow brush, appropriately transformed. In STEP 330, instructions to paint the main reflection bounding box with the main brush transformed by the reflection transformation matrix are added to the main display list. In other words, the instructions are to fill the main reflection bounding box with the main brush, appropriately transformed.

Figure 4A:
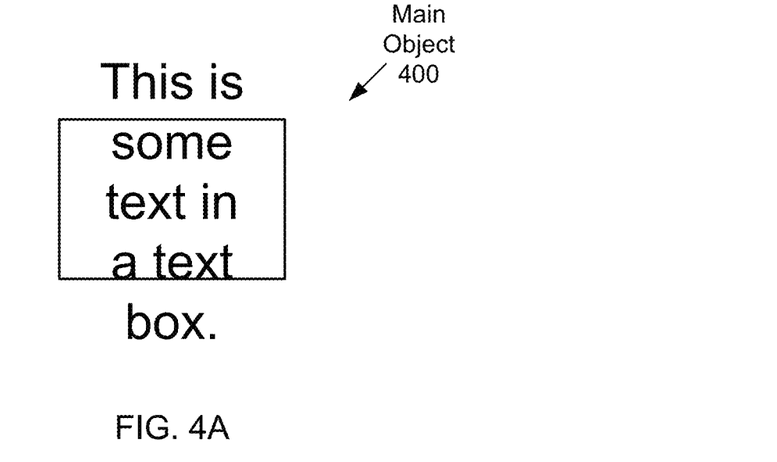
FIGS. 4A, 4B, 5, 6, and 7 show examples in accordance with one or more embodiments of the invention.

FIG. 4A shows an example main object (400) in accordance with one or more embodiments of the invention. As shown in FIG. 4A, the main object (400) includes both text and a box.

Figure 4B:
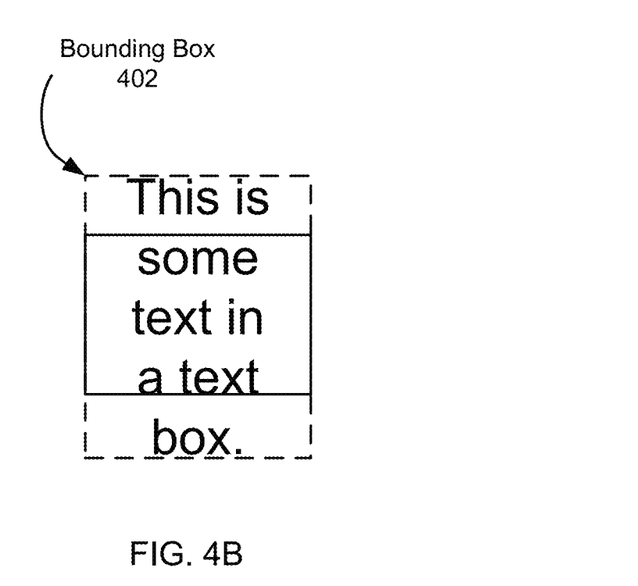

FIG. 4B shows a bounding box (402) of the main object (400). Although the main object (400) is specified in an ED, the bounding box (402) is not reliably specified by the ED. However, the bounding box (402) may be determined by creating an auxiliary brush (i.e., a sizing brush group) for the main object, and then obtaining the bounding box (402) from the auxiliary brush (i.e., the bounding box is a property of the auxiliary brush that can be accessed).

Figure 5:
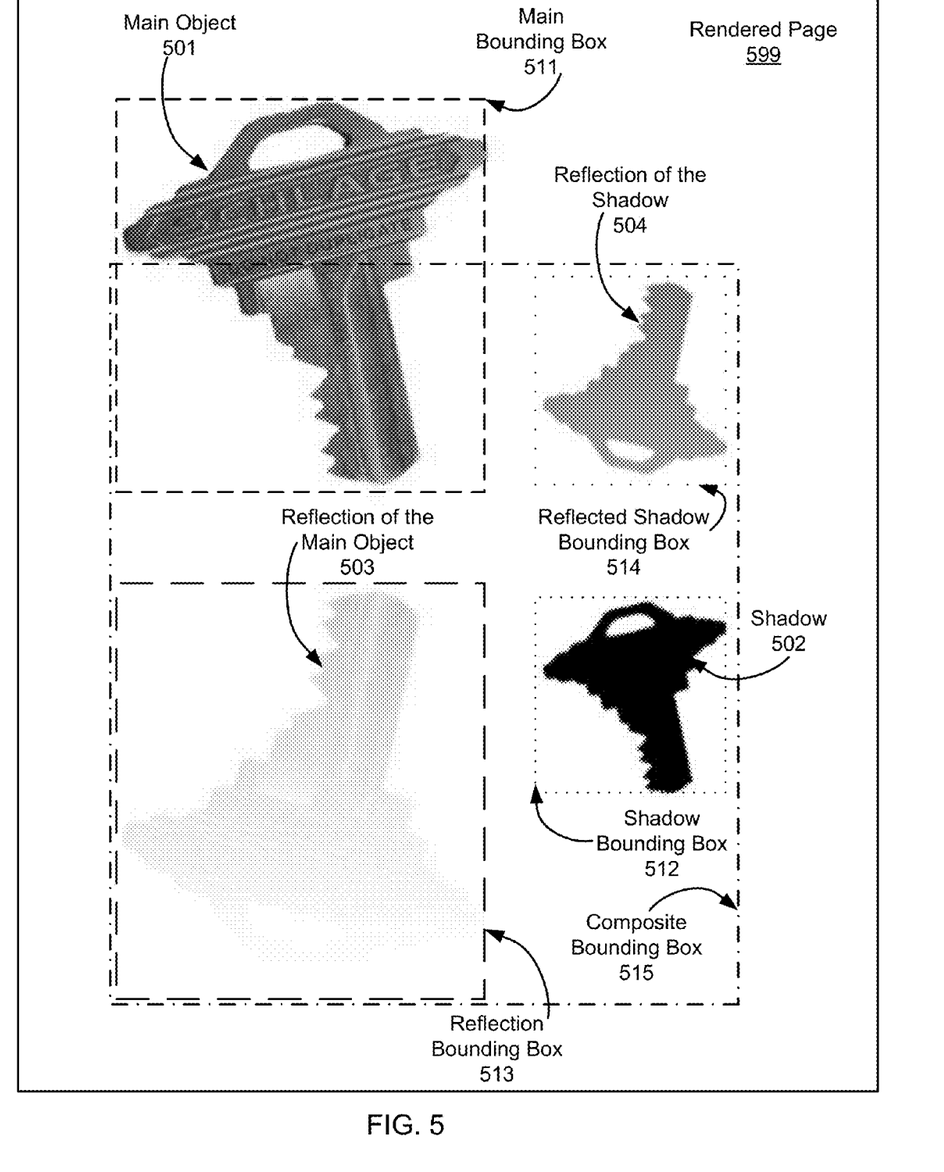

FIG. 5 shows an example rendered page (599) in accordance with one or more embodiments of the invention. As shown in FIG. 5, the rendered page (599) includes a main object (501), a shadow of the main object (502), a reflection of the main object (503), and a reflected shadow (504). FIG. 5 also shows the bounding boxes (i.e., Main Bounding Box (511); Shadow Bounding Box (512); Reflection Bounding Box (513); and Reflected Shadow Bounding Box (514)) for the main object (501), the shadow (502), the reflection (503), and the reflected shadow (504). In this example, the Main Bounding Box (511) corresponds to the main_bbox_after, as it includes transformations applied to the main object (501). Further, FIG. 5 shows a composite bounding box (515) corresponding to a union of the reflection bounding box (513) and the reflected shadow bounding box (514).

The location and dimensions of the shadow bounding box (512) are based on the main bounding box (511), transformation data for the main object, and the shadow parameters specified by the ED. Once the shadow bounding box (512) is calculated, the transformation(s) mapping the main object (501) to the shadow (502) can be calculated to create a shadow brush. The color and transparency features of the shadow brush are dictated by the shadow parameters. Similarly, the location and dimensions of the reflection bounding box (513) are based on the main bounding box (511) and the reflection parameters specified by the ED, while the location and dimensions of the reflected shadow bounding box (514) are based on the shadow bounding box (512), the main bounding box (511), and the reflection parameters. Once the reflection bounding box (513) and reflected shadow bounding box (514) are calculated, the transformations mapping the main object (501) and the shadow (502) to their respective reflections can be calculated. These transformations are used in conjunction with the main brush and the shadow brush to paint the reflection bounding box (513) and the reflected shadow bounding box (514), respectively.

A linear gradient opacity brush is applied across both reflections according to reflection parameters. In other words, the linear gradient opacity brush is applied across the composite bounding box (515) so that, in this particular case, the lower edge of the main object reflection (503) is completely translucent while the upper edge of the reflection of the shadow (504) is completely opaque. In general, the exact nature and effect of the opacity gradient depends upon the reflection parameters and the positions and extents of the reflected objects in relation to the gradient.

Figure 6:
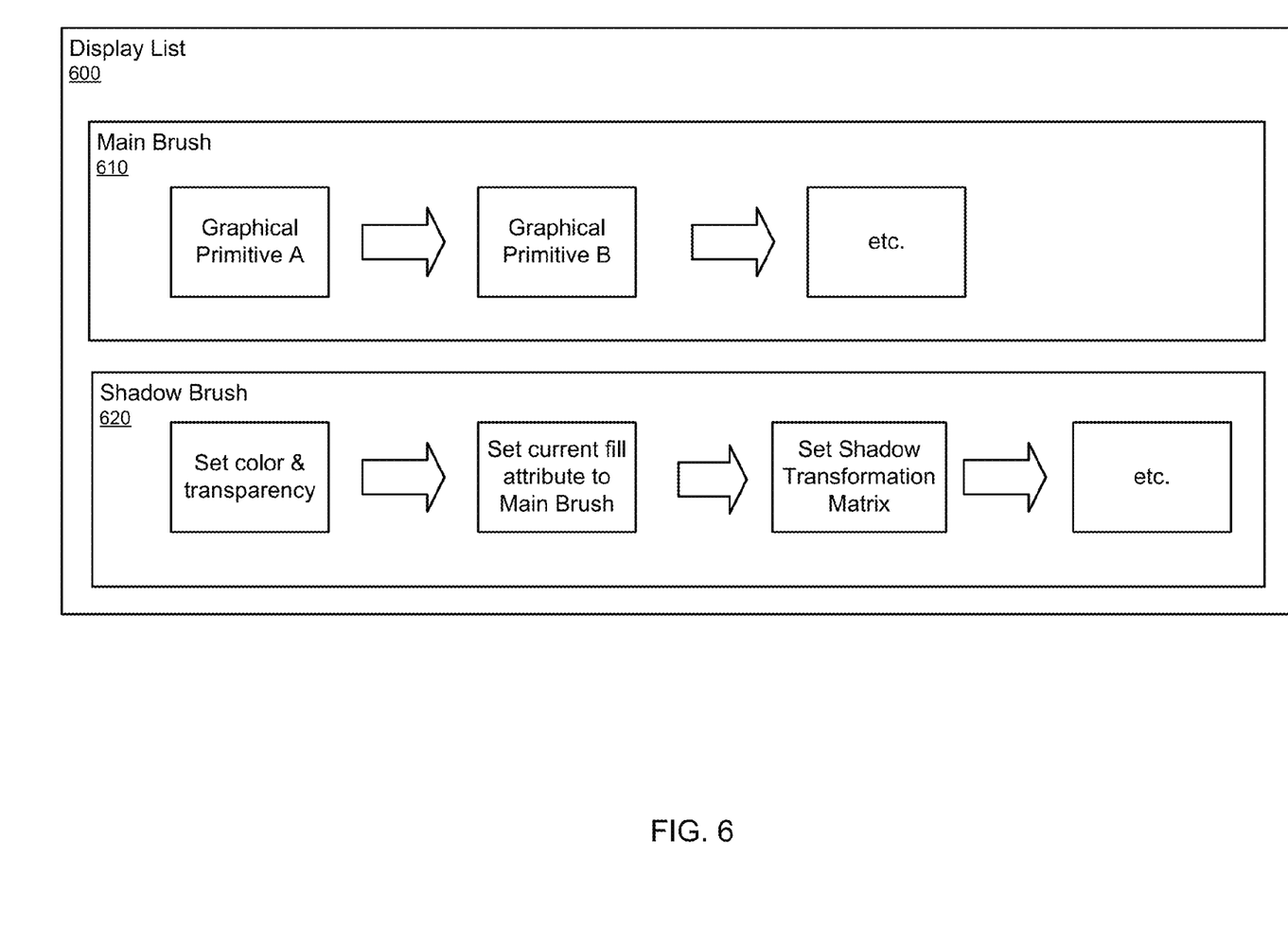

FIG. 6 shows an example in accordance with one or more embodiments of the invention. Specifically, FIG. 6 shows a display list (600) for creating the main brush and the shadow brush. As shown in FIG. 6, the main brush (610) includes multiple graphical primitives that can later be rendered to display the main object. The shadow brush (620) includes instructions to render a shadow. Specifically, the shadow brush (620) includes (i) the shadow color (e.g., black), derived from the shadow parameters; (ii) instructions to set the current fill attribute to the main brush (610), including a transformation matrix which will transform the main brush (610) such that it will produce the shadow; and (iii) instructions to paint with the transformed main brush. The display list (600) is not directly rendered into the main frame buffer. Instead, the main brush (610) and the shadow brush (620) are rendered into separate intermediary frame buffers. These intermediary frame buffers will serve as brushes for the example detailed in FIG. 7. In order words, the intermediary frame buffers will be used to output the reflection(s), shadow, and main object for the page.

Figure 7:
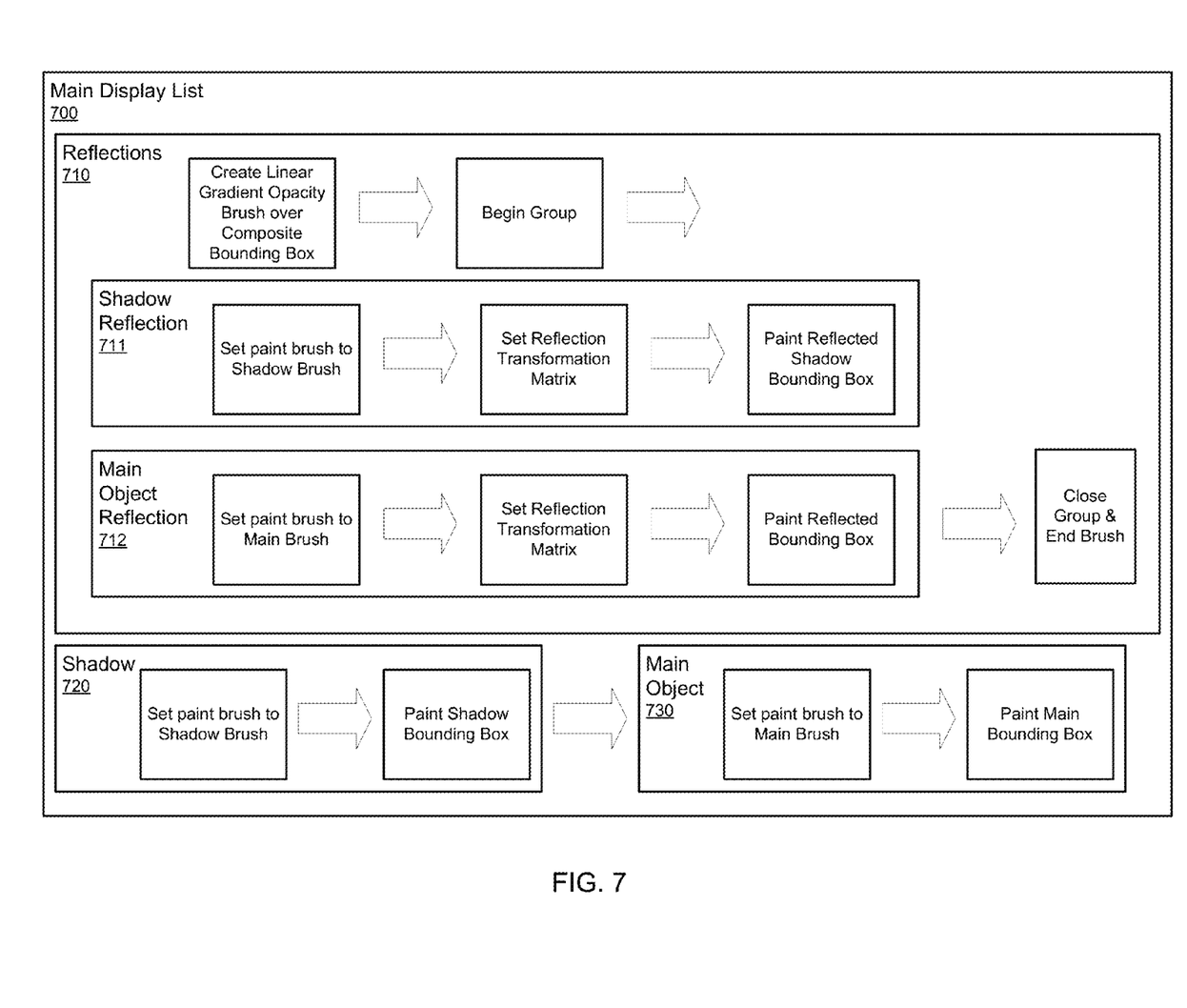

FIG. 7 shows an example in accordance with one or more embodiments of the invention. Specifically, FIG. 7 shows a main display list (700) for the page. As shown in FIG. 7, the main display list (700) includes instructions for painting the reflections (710) on the page; instructions for painting the shadow (720) on the page; and instructions for painting the main object (730) on the page.

Still referring to FIG. 7, the instructions to create the reflections (710) include instructions to create a linear gradient opacity brush over the composite bounding box, and group the shadow reflection (711) and the main object reflection (712). The instructions to output the shadow reflection (711) include instructions to: (i) set the paint brush to the shadow brush (i.e., from FIG. 6), including a transformation matrix which will transform the shadow brush such that it produces the reflected shadow; and (ii) paint the reflected shadow bounding box with the transformed shadow brush. Similarly, the instructions to output the reflection of the main object include instructions to: (i) set the paint brush to the main brush (i.e., from FIG. 6), including a transformation matrix which will transform the main brush such that it produces the reflected main object; and (ii) paint the reflection bounding box with the transformed main brush.

Finally, the instructions to create the shadow (720) include instructions to paint the shadow bounding box with the shadow brush. Similarly, the instructions to create the main object (730) include instructions to paint the main bounding box with the main brush.

Embodiments of the invention have one or more of the following advantages: the ability to create shadows for a main object; the ability to create reflections for the main object and/or the shadow of the main object; the ability to create the reflections and the shadow based on a main brush comprising the main object; the ability to determine the bounding box of the main object on the page using a sizing brush; the ability to create a main brush and use various transformations of the main brush to fill the shadow bounding box, the reflection bounding box, and the reflected shadow bounding box; etc.

Figure 8:
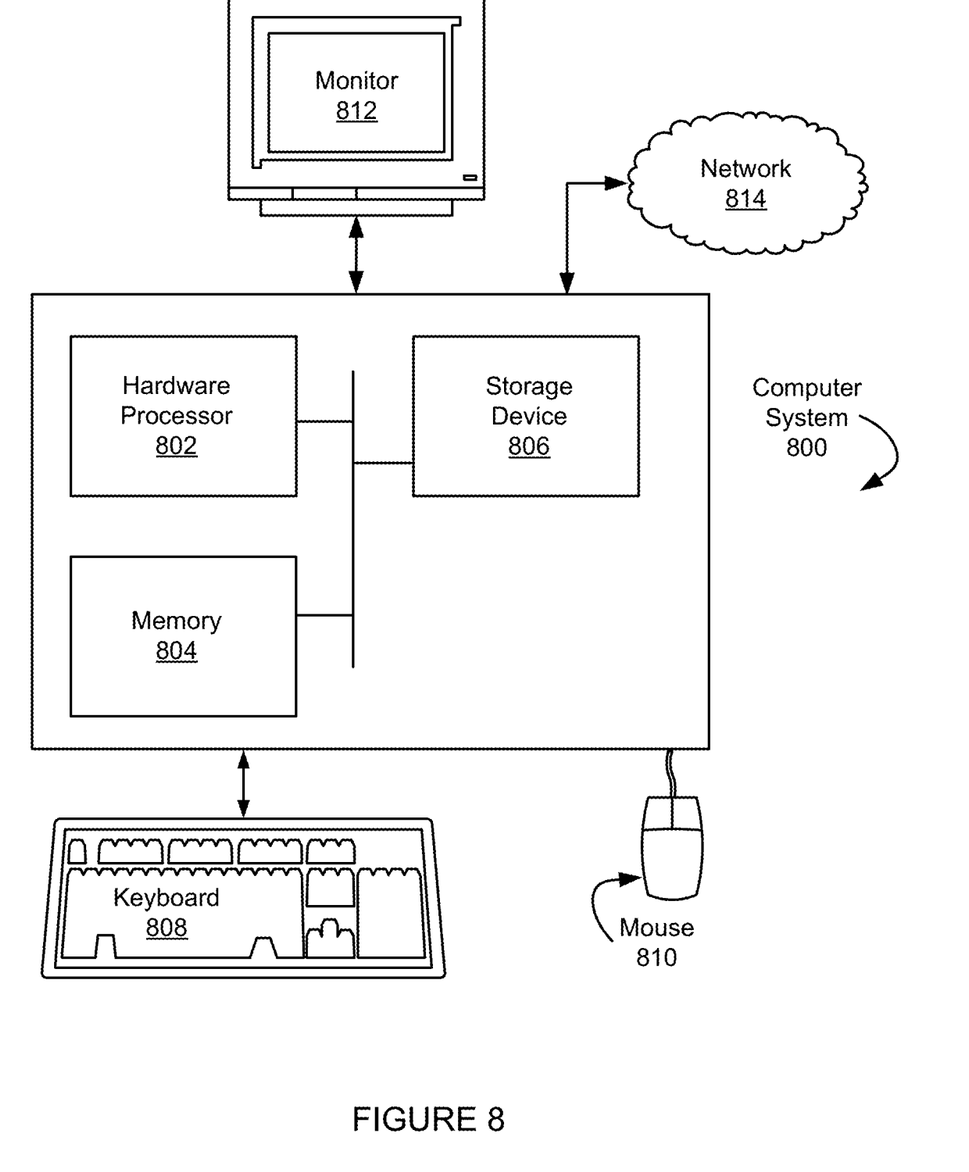
FIG. 8 shows a computer system in accordance with one or more embodiments of the invention.

Embodiments of the invention may be implemented on virtually any type of computer regardless of the platform being used. For example, as shown in FIG. 8, a computer system (800) includes one or more hardware processor(s) (802) (such as a central processing unit (CPU), integrated circuit, etc.), associated memory (804) (e.g., random access memory (RAM), cache memory, flash memory, etc.), a storage device (806) (e.g., a hard disk, an optical drive such as a compact disk drive or digital video disk (DVD) drive, a flash memory stick, etc.), and numerous other elements and functionalities typical of today's computers (not shown). The computer system (800) may also include input means, such as a keyboard (808), a mouse (810), or a microphone (not shown). Further, the computer system (800) may include output means, such as a monitor (812) (e.g., a liquid crystal display (LCD), a plasma display, or cathode ray tube (CRT) monitor). The computer system (800) may be connected to a network (814) (e.g., a local area network (LAN), a wide area network (WAN), the Internet, or any other type of network) via a network interface connection (not shown). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

Further, in one or more embodiments of the invention, one or more elements of the aforementioned computer system (800) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a tape, a hard drive, punch cards, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for rendering a page, comprising:
obtaining an electronic document (ED) identifying a main object and a plurality of shadow parameters;
determining a main bounding box surrounding the main object on the page;
creating a main brush comprising the main object;
calculating a shadow bounding box based on the main bounding box and at least one of the plurality of shadow parameters;
creating a shadow brush by applying a shadow transformation matrix to the main brush, wherein the shadow transformation matrix maps the main object to a shadow defined by the plurality of shadow parameters;
inserting, into a main display list for the page, a first plurality of instructions to:
paint the shadow bounding box with the shadow brush; and
paint the main bounding box with the main brush; and
rendering the page according to the main display list.

2. The method of claim 1, further comprising:
modifying the main bounding box according to a main object transformation parameter before painting the main bounding box,
wherein the ED further identifies the main object transformation parameter, and
wherein the shadow transformation matrix is calculated based on the main object transformation parameter.

3. The method of claim 2, wherein the main object transformation parameter comprises at least one selected from a group consisting of skewing, translating, scaling, and rotating.

4. The method of claim 1, further comprising:
calculating a reflection bounding box based on a plurality of reflection parameters, wherein the ED further identifies the plurality of reflection parameters;
calculating a reflection transformation matrix mapping the main object to a reflection defined by the plurality of reflection parameters; and
inserting into the main display list a second plurality of instructions before the first plurality of instructions to:
paint the reflection bounding box with the main brush after applying the reflection transformation matrix to the main brush.

5. The method of claim 4, further comprising:
calculating a reflected shadow bounding box based on the plurality of reflection parameters;
calculating a shadow reflection transformation matrix mapping the shadow to a shadow reflection defined by the plurality of reflection parameters;
calculating a composite bounding box comprising the reflection bounding box and the reflected shadow bounding box; and
inserting, into the main display list, a third plurality of instructions before the second plurality of instructions to:
apply a linear gradient opacity brush over the composite bounding box; and
paint the reflected shadow bounding box with the shadow brush after applying the shadow reflection transformation matrix to the shadow brush.

6. The method of claim 5, wherein the plurality of reflection parameters comprises at least one selected from a group consisting of scaling, skewing, and an alpha gradient ramp value.

7. The method of claim 1, further comprising:
calculating a reflected shadow bounding box based on a plurality of reflection parameters,
wherein the electronic document further identifies the plurality of reflection parameters;
calculating a shadow reflection transformation matrix for a mapping from the shadow to a shadow reflection defined by the plurality of reflection parameters; and
inserting, into the main display list, a second plurality of instructions before the first plurality of instructions to:
paint the reflected shadow bounding box with the shadow brush after applying the shadow reflection transformation matrix to the shadow brush.

8. The method of claim 1, wherein the plurality of shadow parameters comprises at least one selected from a group consisting of: shadow alignment, shadow direction, shadow offset distance, color, and transparency.

9. A method for rendering a page, comprising:
obtaining an electronic document (ED) identifying a main object and a plurality of reflection parameters;
determining a main bounding box surrounding the main object on the page;
creating a main brush comprising the main object;
calculating a reflection bounding box based on the main bounding box and the plurality of reflection parameters;
calculating a reflection transformation matrix mapping the main object to a reflection defined by the plurality of reflection parameters; and
inserting, into a main display list for the page, a plurality of instructions to:
paint the reflection bounding box with the main brush after applying the reflection transformation matrix to the main brush; and
paint the main bounding box with the main brush; and
rendering the page according to the main display list.

10. A non-transitory computer readable storage medium storing instructions for rendering a page, the instructions comprising functionality to:
obtain an electronic document (ED) identifying a main object and a plurality of shadow parameters;
determine a main bounding box surrounding the main object on the page;
create a main brush comprising the main object;
calculate a shadow bounding box based on the main bounding box and at least one of the plurality of shadow parameters;
create a shadow brush by applying a shadow transformation matrix to the main brush, wherein the shadow transformation matrix maps the main object to a shadow defined by the plurality of shadow parameters; and
insert, into a main display list for the page, a first plurality of rasterizer instructions to:
paint the shadow bounding box with the shadow brush; and
paint the main bounding box with the main brush.

11. The non-transitory computer readable storage medium of claim 10, the instructions further comprising functionality to:
modify the main bounding box according to a main object transformation parameter before painting the main bounding box,
wherein the ED further identifies the main object transformation parameter, and
wherein the shadow transformation matrix is calculated based on the main object transformation parameter.

12. The non-transitory computer readable storage medium of claim 10, the instructions further comprising functionality to:
calculate a reflection bounding box based on a plurality of reflection parameters,
wherein the ED further identifies the plurality of reflection parameters;
calculate a reflection transformation matrix mapping the main object to a reflection defined by the plurality of reflection parameters; and
insert, into the main display list, a second plurality of rasterizer instructions before the first plurality of rasterizer instructions to:
paint the reflection bounding box with the main brush after applying the reflection transformation matrix to the main brush.

13. The non-transitory computer readable storage medium of claim 12, the instructions further comprising functionality to:
calculate a reflected shadow bounding box based on the plurality of reflection parameters;
calculate a shadow reflection transformation matrix mapping the shadow to a shadow reflection defined by the plurality of reflection parameters;
calculate a composite bounding box comprising the reflection bounding box and the reflected shadow bounding box; and
insert, into the main display list, a third plurality of rasterizer instructions before the second plurality of rasterizer instructions to:
apply a linear gradient opacity brush over the composite bounding box; and
paint the reflected shadow bounding box with the shadow brush after applying the shadow reflection transformation matrix to the shadow brush.

14. The non-transitory computer readable storage medium of claim 10, wherein the plurality of reflection parameters comprises at least one selected from a group consisting of scaling, skewing, and an alpha gradient ramp value.

15. The non-transitory computer readable storage medium of claim 10, the instructions further comprising functionality to:
   calculate a reflected shadow bounding box based on a plurality of reflection parameters, wherein the electronic document further identifies the plurality of reflection parameters;
   calculate a shadow reflection transformation matrix for a mapping from the shadow to a shadow reflection defined by the plurality of reflection parameters; and
   insert, into the main display list, a second plurality of rasterizer instructions before the first plurality of rasterizer instructions to:
      paint the reflected shadow bounding box with the shadow brush after applying the shadow reflection transformation matrix to the shadow brush.

16. The non-transitory computer readable storage medium of claim 10, wherein the plurality of shadow parameters comprises at least one selected from a group consisting of:
   shadow alignment, shadow direction, and shadow offset distance, color, and transparency.

17. A system for rendering a page of an electronic document (ED) identifying a main object and a plurality of shadow parameters, comprising:
   a hardware processor;
   a bounding box calculator executing on the hardware processor and configured to calculate a shadow bounding box based on a main bounding box surrounding the main object on the page and at least one of the plurality of shadow parameters;
   a transformation matrix generator executing on the hardware processor and configured to calculate a shadow transformation matrix mapping the main object to a shadow defined by the plurality of shadow parameters;
   a brush generator executing on the hardware processor and configured to:
      create a main brush based on the main object; and
      create a shadow brush by applying the shadow transformation matrix to the main brush; and
   a rasterizing engine executing on the hardware processor and configured to:
      paint the shadow bounding box with the shadow brush; and
      paint the main bounding box with the main brush.

18. The system of claim 17, wherein the bounding box calculator is further configured to modify the main bounding box according to a main object transformation parameter, and wherein the shadow transformation matrix is calculated based on the main object transformation parameter.

19. The system of claim 17, wherein the matrix generator is further configured to calculate a reflection transformation matrix mapping the main object to a reflection defined by a plurality of reflection parameters, and wherein the rasterizing engine is further configured to paint a reflection bounding box with the main brush after applying the reflection transformation matrix to the main brush.

20. The system of claim 19, wherein the matrix generator is further configured to calculate a shadow reflection transformation matrix mapping the shadow to a shadow reflection defined by the plurality of reflection parameters, and wherein the rasterizing engine is further configured to:
   apply a linear gradient opacity brush over a composite bounding box comprising a reflected shadow bounding box and the reflection bounding box; and
   paint the reflected shadow bounding box with the shadow brush after applying the shadow reflection transformation matrix to the shadow brush.

21. The system of claim 17, wherein the matrix generator is further configured to calculate a shadow reflection transformation matrix mapping the shadow to a shadow reflection defined by the plurality of reflection parameters, and wherein the rasterizing engine is further configured to paint a reflected shadow bounding box with the shadow brush after applying the shadow reflection transformation matrix to the shadow brush.

* * * * *